United States Patent [19]
Zimmermann

[11] 3,863,029
[45] Jan. 28, 1975

[54] TAPE POSITION INDICATOR MEANS FOR TELEPHONE ANSWERING APPARATUS

[75] Inventor: Joseph J. Zimmermann, Elm Grove, Wis.

[73] Assignee: GTE Automatic Electric Laboratories Incorporated, Northlake, Ill.

[22] Filed: Aug. 3, 1973

[21] Appl. No.: 385,520

[52] U.S. Cl. .................................... 179/6 E, 179/2
[51] Int. Cl. .......................................... H04m 11/00
[58] Field of Search ......... 179/2 A, 6 R, 6 E, 6 AC, 179/100, 2 B; 340/147 A, 204; 73/206; 360/137

[56] References Cited

UNITED STATES PATENTS

| | | | |
|---|---|---|---|
| 2,063,323 | 12/1936 | Mallina | 179/6 R |
| 3,427,403 | 2/1969 | Stokes et al. | 179/2 A |
| 3,573,360 | 4/1971 | Rose, Jr. | 179/100.2 B |
| 3,609,726 | 9/1971 | Stewart, Jr. | 340/204 |

*Primary Examiner*—James W. Moffitt
*Assistant Examiner*—Stewart Levy
*Attorney, Agent, or Firm*—Robert J. Black

[57] ABSTRACT

An arrangement for visually observing the position of a tape on automatic telephone answering apparatus after the apparatus has been accessed with a remotely located control unit, by transmitting a tone of varying frequency depending on the position of the tape. The tone is produced by a tone oscillator tuned by an external variable capacitor mechanically coupled to the tape reel to be monitored. The rotation of the variable capacitor is geared down from that of the tape reel so that the variable capacitor will rotate a relatively small amount as the tape reel continues to rotate. Accordingly, for any position of the tape, there is a corresponding position for the rotor plates of the variable capacitor and a corresponding output frequency from the tone generator.

5 Claims, 3 Drawing Figures

TAPE POSITION INDICATOR MEANS FOR TELEPHONE ANSWERING APPARATUS

Figure 1:
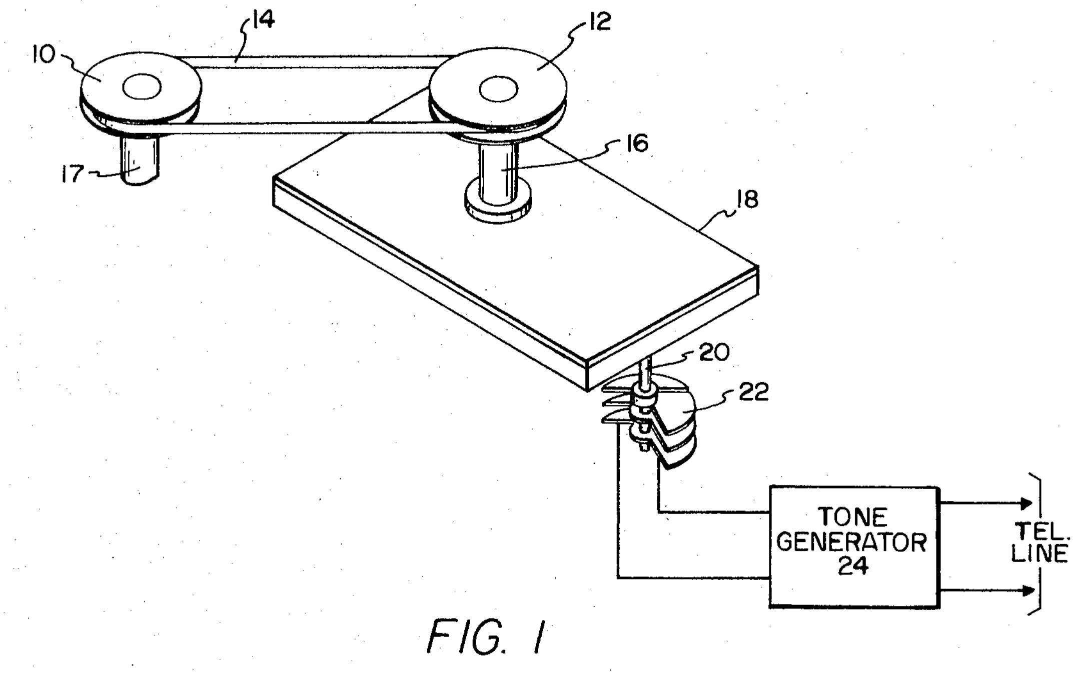

This invention relates to automatic telephone answering apparatus and particularly to an arrangement and method of visually observing the position of a tape on such apparatus after the apparatus has been accessed with a remotely located control unit.

Telephone answering apparatus is used to answer incoming telephone calls when the telephone subscriber is absent or when the subscriber cannot conveniently answer the telephone personally. For example, when doctors and other professional subscribers are out of the office, calling parties can be told where the subscriber can be reached or asked to leave a message. Or, dry cleaners, laundries, repair shops and the like can accept orders over the telephone without personally answering the telephone. When the subscriber returns to the office or is free to accept the recorded messages, they can be played back over a reproducing apparatus and handled accordingly.

In many instances, the telephone answering apparatus is provided with a remote callback device which permits the subscriber to call his own telephone and receive all of his recorded messages. In such cases, the incoming calls are recorded on any suitable telephone answering apparatus having a recording medium adapted to be played back, i.e., reproduced by an associated reproducer in the equipment. As the incoming calls are recorded, an integrating timer is actuated to set a control circuit in accordance with the number of incoming calls. When the subscriber wishes to play back the recorded messages, he may call the recording telephone station from a remote telephone by placing a conventional telephone call. The telephone answering device will answer the call. The calling subscriber then sends a signal over the telephone lines which actuates the remote playback mechanism and the control circuit including circuit altering means which automatically completes the whole playback cycle. The control circuit and remote playback mechanism includes control means to first reset the recording mechanism to its initial position, if necessary, and then to reproduce the recorded messages, and finally to reset the answering equipment to standby.

In some instances, the telephone answering apparatus also is provided with means which when operated provide an indication of the position of the tape on the apparatus, so that the subscriber can determine how much of the tape has been recorded or, alternatively, how much tape remains to be recorded. Tape position indicators for this purpose generally have been expensive and/or complex, and have taken the form of a digital type indicator or an indicator which is dependent upon tape speed. For these, as well as other, reasons, these prior tape position indicators have been generally unacceptable and improved simplified indicators have been sought.

Accordingly, it is an object of the present invention to provide an improved arrangement and method for visually observing the position of a tape on a telephone answering apparatus after the apparatus has been accessed with a remotely located control unit.

Other objects of the invention will in part be obvious and will in part appear hereinafter.

The above objectives are accomplished with an arrangement and method which consists of transmitting a tone of varying frequency depending on the position of the tape. A tone is produced by a tone oscillator tuned by an external variable capacitor mechanically coupled to the tape reel to be monitored. The rotation of the variable capacitor is geared down from that of the tape reel so that the variable capacitor will rotate a relatively small amount as the tape reel continues to rotate. Accordingly, for any position of the tape, there is a corresponding position for the rotor plates of the variable capacitor and a corresponding output frequency from the tone generator.

Figure 2:
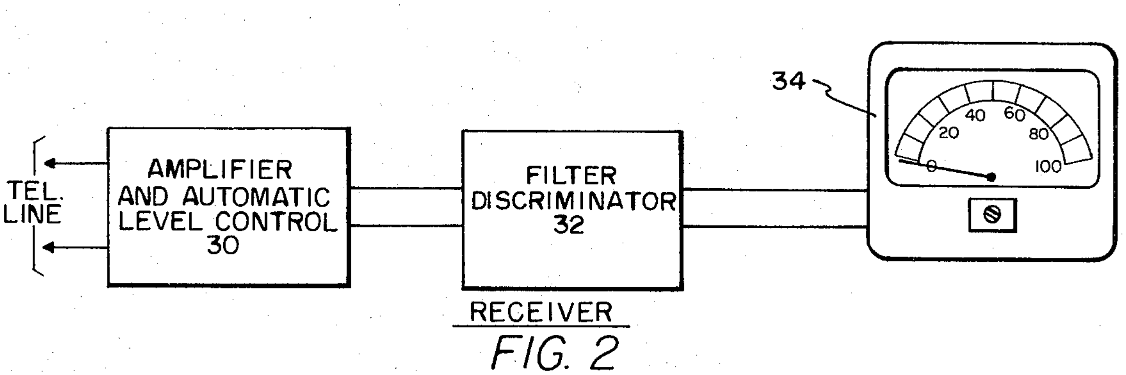
Figure 3:
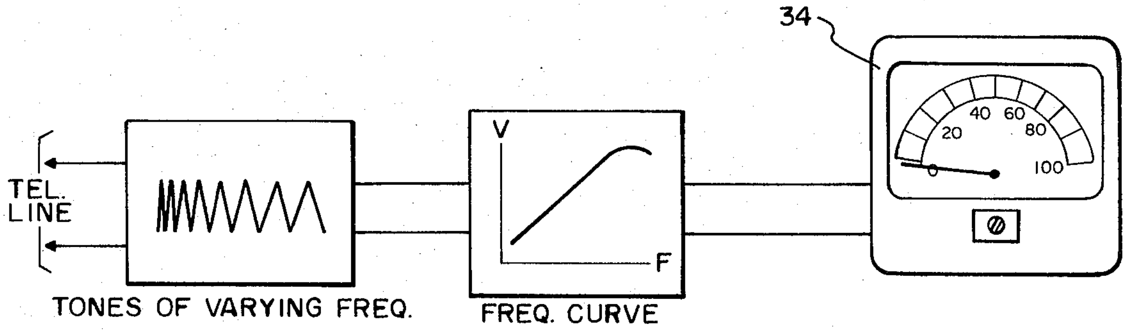

For a fuller understanding of the nature and objects of the invention, reference should be had to the following detailed description taken in connection with the accompanying drawings, in which:

FIG. 1 is a simplified partial illustration of a telephone answering apparatus, generally illustrating the manner in which an external variable capacitor can be mechanically coupled to a tape reel to be monitored;

FIG. 2 is a block diagram schematic generally illustrating the receiver portion of the remotely located control unit for operating the telephone apparatus for providing a visual indication of the position of the tape on the remotely located telephone answering device; and FIG. 3 is a view generally illustrating the outputs of the various circuits of the receiver portion of the remotely located control unit.

Referring now to the drawings, the telephone answering apparatus generally illustrated in FIG. 1 may be of any suitable variety which automatically answers the telephone and records the incoming messages. Apparatus to reproduce the recorded message, if not included in the recorder, must also be provided.

The usual telephone answering apparatus is actuated by a ringing current in a telephone line through a trigger circuit. The trigger circuit includes a capacitor or other suitable device which blocks the normal direct current in the line, but which allows the alternating current of a ringing signal to actuate the circuit to close a contact and connect a transformer across the telephone line to simulate the conditions of answering the telephone. The trigger circuit also actuates a reproducer to initiate the transmission of a pre-recorded message through suitable amplifiers in the transformer out over the telephone line to the calling party. The message is of the conventional type which gives instructions or information to the calling party and terminates in a tone signal or other indicia to actuate a recorder in the recording unit. With the recorder operating, the calling party delivers his message over the telephone line, and it is impressed on the tape of the recorder for subsequent transmission or playback to the called subscriber. At the end of a predetermined increment of time, the recorder is disconnected and the reproducer is reset in standby condition to answer subsequent calls at which time the above-described answering cycle is repeated.

The playback function of the answering device is normally accomplished by rewinding the tape recorder to the beginning and then playing it back with the aid of a control device which is either built into the recorder or which is attached thereto for playback functions. The components of the answering apparatus such as the trigger circuit, the reproducer, and the recorder are well-known in the art and are completely described in, for example, U.S. Pats. Nos. 2,848,541 and 3,067,289, along with the control circuits interconnecting them.

A remote function selector can be connected to the telephone answering mechanism for operation by receipt of a tone of pre-determined frequency and duration to actuate the rewind motor of the recorder to afford the subscriber an incremental playback which may be controlled from a remote station. Such a remote function selector may be of the type and connected to the telephone answering mechanism in the manner disclosed in U.S. Pat. No. 3,136,856.

The remote function selector, in addition, may include a telephone actuator relay or the like which is operated in response to a tone of a predetermined frequency to energize a tone generator which is operable to couple tones of varying frequency to the telephone line depending on the position of the tape, in the manner described more fully below.

Referring now to FIG. 1, a mechanical take off by means of a pair of pulleys 10 and 12 and a belt 14 connects the shaft 17 of the tape reel of the tape recorder to be monitored to the input shaft 16 of a gear box reducer transmission 18. The output shaft 20 of this reducer transmission 18 is rigidly coupled to a variable capacitor 22 so that any considerable rotation of the tape reel shaft 17 and the resulting lesser movement or rotation of the output shaft 20 results in a slight detuning of the variable capacitor 22. The changing of the setting of the variable capacitor will vary the output frequency of a tone generator 24 which is a tone oscillator or signal generator whose frequency is tuned by the variable capacitor 22. Thus, for any position of the tape, there will be a corresponding position for the rotor plates of the variable capacitor 22 and a corresponding capacitance and output frequency from the tone generator 24 to the telephone line. Accordingly, whenever the tone generator 24 is energized by means of a remotely located control unit, an output frequency which is tuned by the external variable capacitor 22 which, in turn, has its capacitance varied by the position of the tape, is coupled to the telephone line. The tone generator 24 may be energized in various ways, such as, for example, generally in the manner described in U.S. Pats. Nos. 3,136,856 and 3,067,289, for activating remote function selectors connected to telephone answering mechanisms.

In FIG. 2, the receiver portion of the remotely located control unit at the receiving end of the telephone line includes an amplifier and automatic level control circuit 30 for amplifying and providing a constant level output signal, as generally illustrated in FIG. 3, to a filter discriminator circuit 32. This filter discriminator circuit 32 is broadly tuned to a point slightly above the highest frequency obtainable with the tone generator 24. Thus, if the frequency varies from, for example, 3,000 to 4,000 cycles, by excursions of the tape reel from an empty to a full reel, the voltage corresponding to these frequencies can be read along the straight line portion of the resonant curve, again generally illustrated in FIG. 3.

The output of the filter discriminator 32 is coupled to a meter 34 which is calibrated so that the starting position of the tape will indicate 0 volts or 0 indication on the meter. Tape reels half full will be approximately at a middle frequency and thus a middle voltage or position indication, and a full reel will indicate full voltage or full scale position indication on the meter, since the frequency has approached the resonant point.

Accordingly, from the above description, it can be seen that the tone generator 24 can be energized by means of, for example, a tone signal coupled to the telephone answering apparatus via the telephone line, by means of a remotely located control unit. In this respect, the manner in which the tone generator is energized may be as described in U.S. Pats. Nos. 3,067,289 and 3,136,856. The tone generator 24, upon being energized, will produce and couple to the telephone line a tone signal which is dependent upon the position of the variable capacitor 22 and the position of the latter, in turn, is dependent upon the position of the tape. This tone signal when it is received by the remotely located control unit is amplified, kept at a constant level and coupled to a filter discriminator circuit 32 which is broadly tuned to a point slightly above the highest frequency obtainable with the tone generator 24. The output of this frequency discriminator circuit 32 is coupled to the meter 34 which is calibrated in accordance with the voltage corresponding to the varying frequency along the straight line portion of the resonant curve to visually indicate the position of the tape on the telephone answering device. While in the illustrated embodiment, the tone generator 24 is tuned by means of a variable capacitor 22, its frequency can also be varied by a slug tuner on the oscillator coil in place of the variable capacitor.

It will thus be seen that the objects set forth above among those made apparent from the preceding description, are efficiently attained and certain changes may be made in carrying out the above method and in the construction set forth. Accordingly, it is intended that all matter contained in the above description or shown in the accompanying drawings shall be interpreted as illustrative and not in a limiting sense.

Now that the invention has been described, what is claimed as new and desired to be secured by Letters Patent is:

1. In telephone answering apparatus coupled to a telephone line and including a recorder having a tape for recording messages from the telephone line and a reproducer to transmit the recorded messages to the telephone line, said tape being stored on tape reels, comprising a tone generator including means for varying the frequency of the output tone signals thereof coupled to said telephone line, said means for varying the frequency of the output tone signals of said tone generator being coupled to and operated by the rotation of one of said tape reels, a remotely located control unit including circuit means responsive to said tone signals, said circuit means being broadly tuned to a point slightly above the highest frequency tone signal provided by said tone generator and providing voltage outputs corresponding to the frequencies of said tone signals coupled thereto, and a meter coupled to said circuit means calibrated in accordance with said voltage outputs to provide a visual indication of the position of said tape on said tape reels on said telephone answering apparatus.

2. In telephone answering apparatus as claimed in claim 1, wherein said means for varying the frequency of the output tone signals of said tone generator comprises an external variable capacitor, said variable capacitor being coupled to and the capacitance thereof being varied by the rotation of said one tape reel to vary the frequency of said tone generator.

3. In telephone answering apparatus as claimed in claim 2, further including reduction means included in the coupling between said tape reel and said variable capacitor, whereby any considerable movement of said tape reel results in a slight detuning of said variable capacitor.

4. In telephone answering apparatus as claimed in claim 1, wherein said means for varying the frequency of the output tone signals of said tone generator comprises a slug tuner on the oscillator coil thereof, said slug tuner being coupled to and operated by the rotation of said tape reel to vary the frequency of said tone generator.

5. In telephone answering apparatus as claimed in claim 1, wherein said remotely located control unit further includes amplifier means for amplifying the tone signals coupled thereto and level control means for providing a constant level signal to said circuit means.

* * * * *